United States Patent [19]

Morrisey et al.

[11] 3,722,110
[45] Mar. 27, 1973

[54] EDUCATIONAL TRAINING DEVICE

[76] Inventors: Mary F. Morrisey; Thomas J. Morrisey, both of 3363 Baseline Road, Grand Island, N.Y.

[22] Filed: Apr. 3, 1972

[21] Appl. No.: 240,453

[52] U.S. Cl............................................35/30, 35/77
[51] Int. Cl................................................G09b 19/02
[58] Field of Search.......35/31 R, 31 A, 31 B, 32, 30, 35/77

[56] References Cited

UNITED STATES PATENTS 2,945,303   7/1960   Parkhurst.........................35/31 A X
3,500,558   3/1970   Matejczyk................................35/32

FOREIGN PATENTS OR APPLICATIONS 21,623   0/1893   Great Britain............................35/77

119,374   7/1947   Sweden................................35/31 A

Primary Examiner—Wm. H. Grieb
Attorney—Conrad Christel et al.

[57] ABSTRACT

A manually operable educational device for assisting the user in converting a numeral from one base numeration system to a corresponding numeral in a different base numeration system. The device comprises a frame for housing a plurality of rotatable cylinders having numerical indicia thereon selectively displayed through windows provided in the frame front wall. Mathematical symbols are imprinted on the outer face of the front wall to correlate the displayed numerals in such a manner facilitating the computations thereof to effect the conversion of numerals from one to another base numeration system.

9 Claims, 8 Drawing Figures

| | | | | | | | |
|---|---|---|---|---|---|---|---|
| $2^6$ | $2^5$ | $2^4$ | $2^3$ | $2^2$ | $2^1$ | $2^0$ | — A |
| $3^6$ | $3^5$ | $3^4$ | $3^3$ | $3^2$ | $3^1$ | $3^0$ | — B |
| $4^6$ | $4^5$ | $4^4$ | $4^3$ | $4^2$ | $4^1$ | $4^0$ | — C |
| $5^6$ | $5^5$ | $5^4$ | $5^3$ | $5^2$ | $5^1$ | $5^0$ | — D |
| $6^6$ | $6^5$ | $6^4$ | $6^3$ | $6^2$ | $6^1$ | $6^0$ | — E |
| $7^6$ | $7^5$ | $7^4$ | $7^3$ | $7^2$ | $7^1$ | $7^0$ | — F |
| $8^6$ | $8^5$ | $8^4$ | $8^3$ | $8^2$ | $8^1$ | $8^0$ | — G |
| $9^6$ | $9^5$ | $9^4$ | $9^3$ | $9^2$ | $9^1$ | $9^0$ | — H |
| $10^6$ | $10^5$ | $10^4$ | $10^3$ | $10^2$ | $10^1$ | $10^0$ | — J |

Fig. 7.

| | | | | | | | |
|---|---|---|---|---|---|---|---|
| 64 | 32 | 16 | 8 | 4 | 2 | 1 | — A' |
| 729 | 243 | 81 | 27 | 9 | 3 | 1 | — B' |
| 4,096 | 1,024 | 256 | 64 | 16 | 4 | 1 | — C' |
| 15,625 | 3,125 | 625 | 125 | 25 | 5 | 1 | — D' |
| 46,656 | 7,776 | 1,296 | 216 | 36 | 6 | 1 | — E' |
| 117,649 | 16,807 | 2,401 | 343 | 49 | 7 | 1 | — F' |
| 262,144 | 32,768 | 4,096 | 512 | 64 | 8 | 1 | — G' |
| 531,441 | 59,049 | 6,561 | 729 | 81 | 9 | 1 | — H' |
| 1,000,000 | 100,000 | 10,000 | 1,000 | 100 | 10 | 1 | — J' |

Fig. 8.

EDUCATIONAL TRAINING DEVICE

BACKGROUND OF THE INVENTION

This invention relates to an educational device and, more particularly, to an educational device for assisting the user in converting a numeral in one base numeration system to corresponding numerals in other base numeration systems.

Because of the advance in technology made in recent years and the development of electronic and other types of computers, it has become important to familiarize students in elementary courses in mathematics with mathematical base systems or systems of numeration other than the conventional base "10" numeration system. While the methods or rules for converting from one base numeration system to another are well known, it is frequently difficult to explain such rules to the student in a manner enabling him to comprehend and remember such conversion rules, especially in view of the strong base "10" prejudice previously developed and engrained in the students. Moreover, working out these conversion rules involves a time consuming step-by-step process, further discouraging interest in other numerical base systems.

SUMMARY OF THE INVENTION

Accordingly, it is a primary object of the present invention to provide an improved, manually operable educational training device for use as an instructional aid for converting a numeral in one base numeration system to corresponding numerals in other base numeration systems.

It is another object of this invention to provide the foregoing educational device with manually operable means for displaying a series of exponential notations and their corresponding place values in a selected base numeration system for assisting the user in the understanding and learning of various base numeration systems and to generate interest in the comprehension of various base numeration systems.

It is still another object of the present invention to minimize the time and effort involved in converting a numeral in one base numeration system to an equivalent numeral in a different base numeration system.

It is a further object of this invention to provide an improved education training device which is strong in construction, low in costs, compact in size, rugged and durable in use, and which is relatively easy to use by young students in the elementary courses of mathematics.

The foregoing and other objects, advantages and characterizing features of the present invention will become clearly apparent from the ensuing detailed description of an illustrative embodiment thereof, taken together with the accompanying drawings wherein like reference numerals denote like parts throughout the various views.

BRIEF DESCRIPTION OF THE DRAWINGS

FIG. 7 is a plan view of a strip of material having a plurality of rows of exponential notations thereon corresponding to different base numeration systems, used in conjunction with this invention; and FIG. 8 is a plan view of a strip of material having a plurality of rows of place values thereon corresponding to different base numeration systems, used in conjunction with this invention.

DETAILED DESCRIPTION OF AN ILLUSTRATIVE EMBODIMENT

Figure 1:
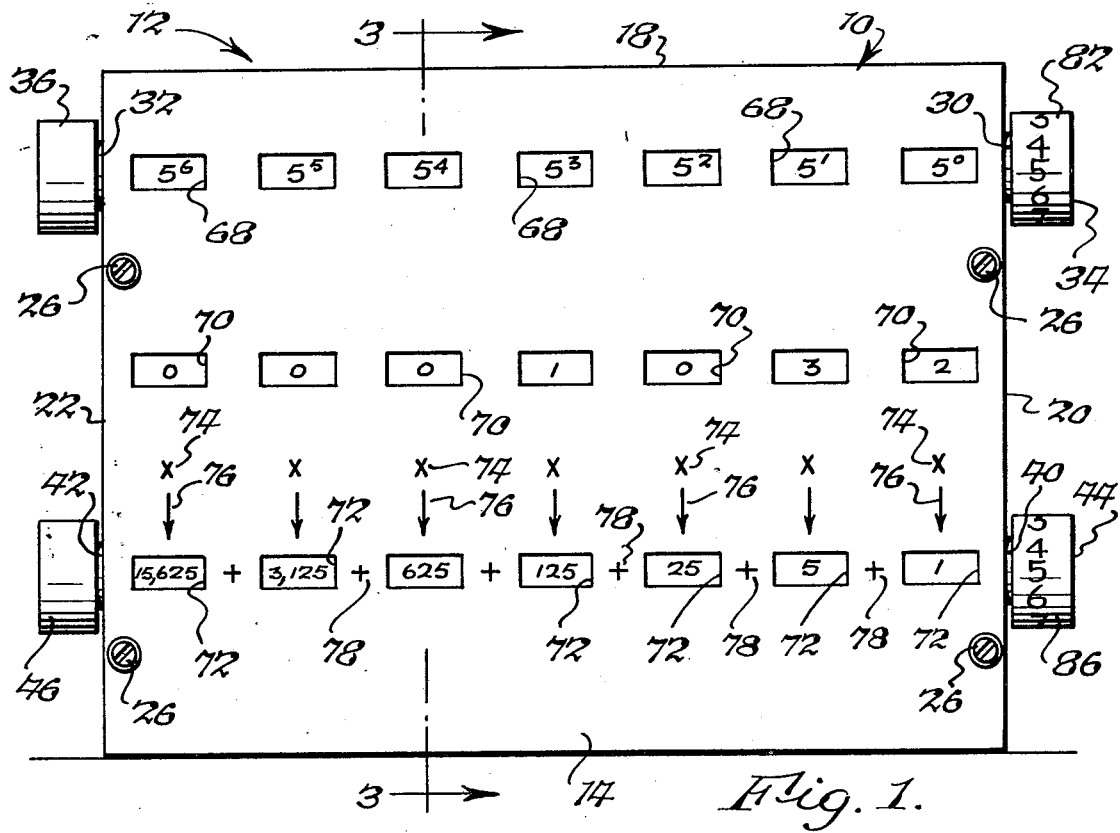
FIG. 1 is a front elevational view of one form of an educational training device, constructed in accordance with this invention.
Figure 2:
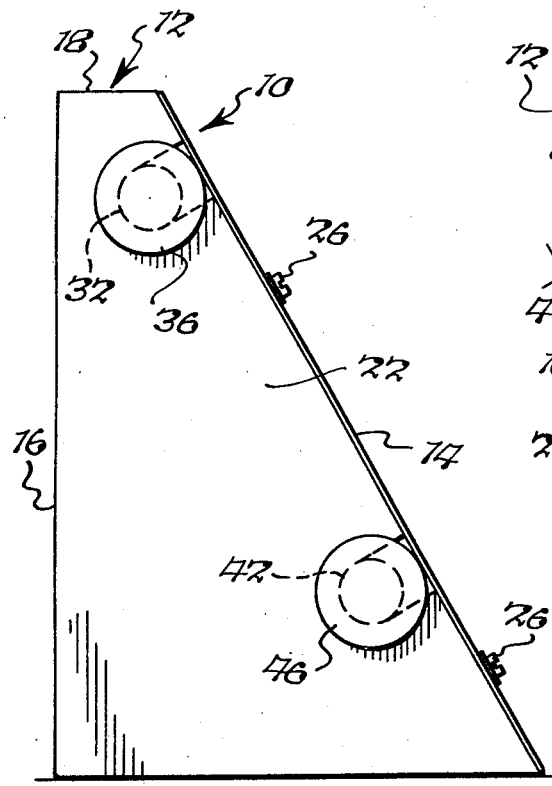
FIG. 2 is a side elevational view thereof.

Referring now in detail to the illustrative embodiment depicted in the accompanying drawings, there is shown in FIG. 1, an educational device, constructed in accordance with this invention and generally designated 10, comprising a housing or frame 12 of a relatively small, compact, portable size so that it may be conveniently carried and supported on a student's desk or small table. Frame 12 comprises an inclined front wall 14 (FIG. 2), a generally vertically extending rear wall 16, a substantially flat top wall 18 and a pair of parallel side walls 20 and 22 of a generally trapezoidal configuration. The lower ends of front wall 14, rear wall 16 and side walls 20 and 22 are turned inwardly to extend in a generally common horizontal plane for properly supporting frame 12 on a horizontal or planar supporting surface, such as a desk for example. The bottom of frame 12 is provided with a large opening 24 to provide access into the interior of frame 12. Also, front wall 14 is removably secured to the inturned marginal edges of side walls 20 and 22, as by means of fasteners 26, to provide access through the front of frame 12. Although frame 12 preferably is formed of metal, it should be understood that frame 12 can be fabricated from any suitable materials, such as wood or plastic for example, if desired.

Figure 4:
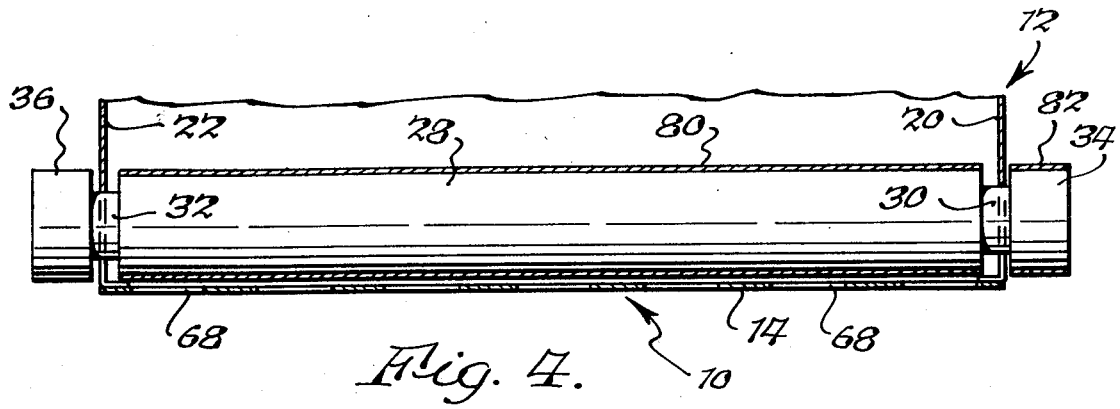
FIG. 4 is a transverse sectional view, taken about on line 4—4 of FIG. 3.

An elongated cylinder 28 (FIG. 4) extends transversely through frame 12 and is provided with opposite end portions 30 and 32 of reduced diameter journalled for rotation in suitable openings provided in side walls 20 and 22. The reduced diameter end portions 30 and 32 project laterally outwardly of said walls 20 and 22 and are provided with knobs 34 and 36 for manually rotating cylinder 28. Knobs 34 and 36 can be formed integral with cylinder 28 or otherwise rigidly secured thereto for rotation therewith. While cylinder 28 preferably is formed of a rigid, wear resistant, plastic material, it should be realized that cylinder 28 can be formed of any suitable lightweight material having the same durable and wear resistant characteristics, such as hard rubber or aluminum for example.

Figure 3:
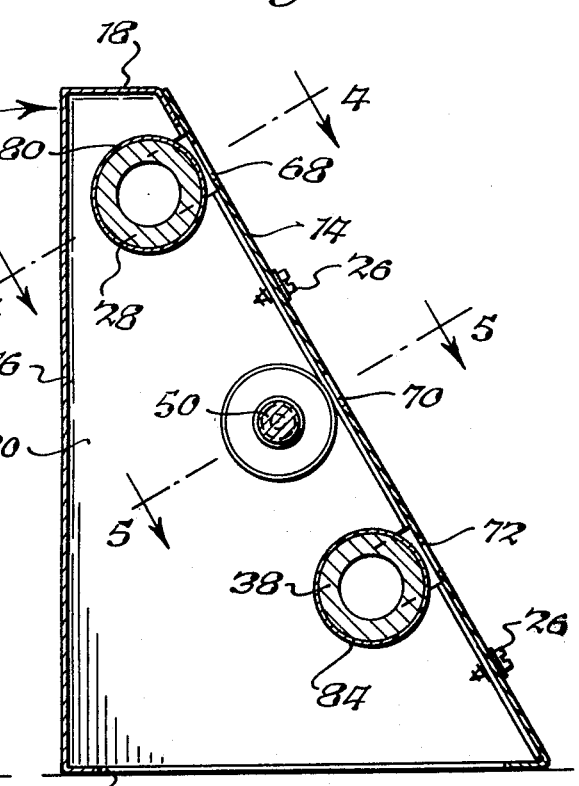
FIG. 3 is a vertical sectional view, taken about on line 3—3 of FIG. 1.

A second elongated cylinder 38 (FIG. 3), extending transversely through frame 12, is provided with opposite end portions 40 and 42 of reduced diameter journalled for rotation in suitable openings provided in side walls 20 and 22. Cylinder 38 is substantially coextensive and parallel to cylinder 28 and is disposed below and forwardly thereof in close proximity to front wall 14. The opposite end portions 40 and 42 project laterally outwardly of side walls 20 and 22 and are provided with knobs 44 and 46 for manually manipulating or rotating cylinder 38. Cylinder 38 preferably is formed of the same material as cylinder 28 with knobs 44 and 46 attached thereto in the same manner as knobs 34 and 36 are connected to cylinder 28.

Figure 5:
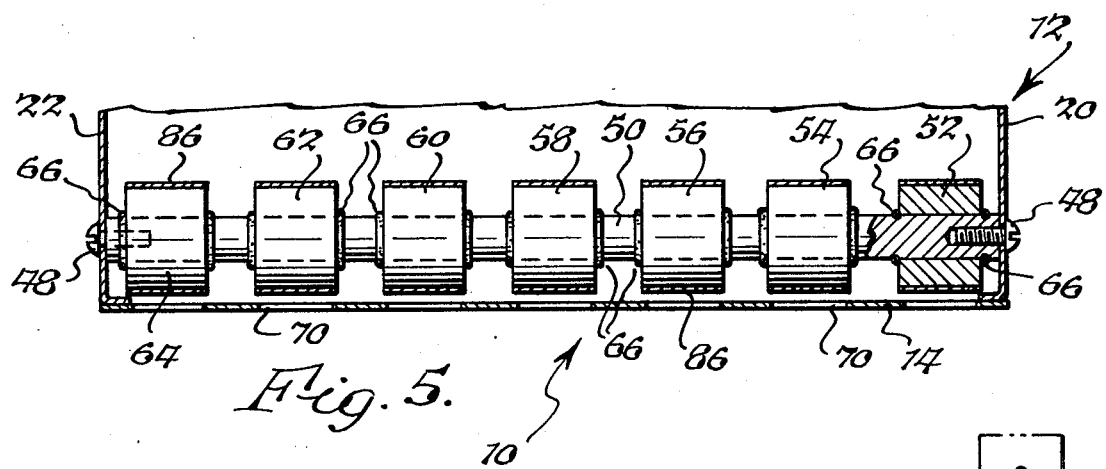
FIG. 5 is a transverse sectional view, taken about on line 5—5 of FIG. 3.

Extending transversely of frame 12 and suitably secured to side walls 20 and 22, as by means of fasteners 48, is an elongated shaft 50 (FIG. 5) interposed between cylinders 28 and 38 in close proximity to front wall 14. A plurality of spaced, individually rotatable stub cylinders 52, 54, 56, 58, 60, 62 and 64 are mounted on shaft 50 for relative rotation thereto. A pair of elastic O-rings 66 are mounted on shaft 50 on opposite sides of each of these cylinders 52–64 to maintain the latter in the proper spaced relation and to prevent longitudinal displacement thereof relative to shaft 50.

As shown in FIG. 1, an upper row of horizontally aligned, generally equally spaced openings or windows 68 are provided in front wall 14. Also, an intermediate row of horizontally aligned, generally equally spaced openings or windows 70 and a lower row of horizontally aligned, generally equally spaced openings or windows 72 are provided in front wall 14. Not only are the windows 68, 70 and 72 in horizontal alignment, but also in vertical alignment as shown in FIG. 1 so that the upper left window 68 is in vertical registry with the intermediate and lower left windows 70 and 72, respectively. Indicia, in the form of a multiplication sign or symbol 74 together with a downwardly directed arrow 76 is imprinted on the outer face of front wall 14 between each pair of windows 70 and 72 indicating that the numeral appearing in window 70 is to be multiplied by the numeral appearing in window 72. Also, an addition sign or symbol 78 is interposed between adjacent windows 72 indicating that the products of the numerals displayed in windows 70 and 72 are to be added together to obtain the desired result.

Cylinder 28 is provided with indicia imprinted on the outer peripheral surface thereof designating a series of circumferentially spaced, horizontally extending rows of base exponential notations, such rows being identified by the letters A through J for base numeral systems from two through ten. These rows of base exponential notations are shown in plan in FIG. 7 and can, in fact, be imprinted on a strip 80 of paper or other suitable material adhesively or otherwise fixedly secured to the peripheral surface of cylinder 28. Each complete row which, in the illustrative embodiment, comprises seven places, is successively displayed through the row of windows 68 by rotating knob 34, the latter being provided with numerals 2 through 10 circumferentially spaced about the periphery of knob 34 in horizontal alignment with their corresponding base numeral systems, respectively. Numerals 2 through 10 can be imprinted directly on knob 34 or on a strip of material 82 circumferentially overlying knob 34 and adhesively or otherwise fixedly secured thereto.

Cylinder 38 also is provided with indicia imprinted on the outer peripheral surface thereof designating a series of circumferentially spaced, horizontally extending rows A' through J' of equivalent place values for base numeral systems two through ten, as shown in plan in FIG. 8. This indicia can be directly imprinted on cylinder 38 or on a strip of material 84 adhesively or otherwise fixedly secured to cylinder 38, as desired. Each complete row A' through J' is successively displayed through the row of windows 72 by rotating knob 44, the latter being provided with numerals 2 through 10 circumferentially spaced about the periphery of knob 44 in horizontal alignment with the place values of their corresponding base numeral systems, respectively. Again, these numerals 2 through 10 can be directly imprinted on knob 44 or on a strip of material 86 circumferentially overlying knob 44 and adhesively or otherwise fixedly secured thereto.

Figure 6:
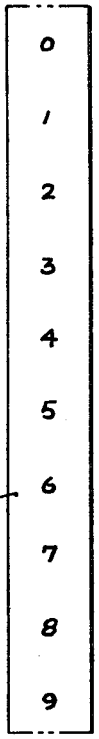
FIG. 6 is a plan view of a strip of material having numerical digits imprinted thereon used in conjunction with this invention.

Circumferentially spaced numerals 0 through 9 are imprinted on each of the cylinders 52 through 64 and are adapted to be selectively displayed through the associated windows 70 to form any desired number for a purpose hereinafter described. This indicia can be directly imprinted on each of such cylinders or on a strip of material 88 (FIG. 6) adhesively or otherwise fixedly secured to each of the cylinders 52 through 64.

Prior to a detailed description of the educational device of this invention, it should be understood that a numeral, comprised of several digits, in a base ten numeration system can be expressed as the sum of a series of exponential notations of base ten or the sum of their respective place values. Thus, the numeral 4567 in a base 10 numeration system means that there are four ($10^3$'s), five ($10^2$'s), six ($10^1$'s and seven ($10^0$'s), the sum of which when substituting place values for the exponential notations is as follows: $(4 \times 1,000) + (5 \times 100) + (6 \times 10) + (7 \times 1) = 4,567$.

In order to change or convert a numeral in a base numeration system other than 10, such as the numerals 1032 in the base five numeration system for example and which is conventioally expressed as $1032_5$, the following procedure is followed:

The expression $1032_5$ means that there are one ($5^3$'s) zero or no ($5^2$'s), three ($5^1$'s) and two ($5^0$'s). Substituting the place values for the exponential notations and adding these products together renders the following result:

$$(1 \times 125) + (0 \times 25) + (3 \times 5) + (2 \times 1) \text{ or}$$

$$125 + 0 + 15 + 2 = 142$$

Thus, $1032_5$ is equivalent to $142_{10}$.

To convert a numeral from the base 10 numeration system to a lower base numeral system, such as base five for example, the following procedure is followed:

Noting that the highest place value of the base five numeration system that can be divided into 117 is 25, and dividing the former by the latter results in the quotient 4, meaning that there are four (25's) in 117 with 17 remaining. Proceeding down the exponential or place value scale, 17 is divided by 5 to determine that there are three ($5^1$'s) in 17 with 2 remaining. Dividing the remaining 2 by 1 results in the quotient 2. This total result is expressed as $432_5$.

The same result can be obtained in one operation in the following manner;

$$25 \overline{)117} = (4$$
$$\underline{100}$$
$$5 \overline{)17} = (3$$
$$\underline{15}$$
$$1 \overline{)2} = (2 \quad \text{or } 432_5.$$

The educational device 10 of this invention is utilized to readily convert a numeral in one base numeration system to a corresponding numeral in a different base numeration system without having to rely on memory or remember the long hand conversion methods set forth above. The mode of operation of educational device 10 is as follows:

Again, assuming that it is desired to equate $1032_5$ to a numeral in the base 10 numeration system, cylinders 52, 54, 56 and 58 are rotated to bring each of the digits of numeral 1032 into view through windows 70, as shown in the illustrative embodiment of FIG. 1. Next, knobs 34 and 44 are manipulated to rotate cylinders 28 and 38 and display the row D of exponential notations of the base five numeration system and the row D' of place values thereof through the rows of windows 68 and 72, respectively, as shown in FIG. 1. Now, multiplying the place value numerals appearing in each window 72 by the digits displayed through windows 70 and adding the products thereof in accordance with the multiplication and addition symbols 74 and 78 imprinted on the face of front wall 14 yields the following result: $(1 \times 125) + (0 \times 25) + (3 \times 5) + (2 \times 1) = 125 + 0 + 15 + 2 = 142_{10}$.

Using another example, to convert $1011_2$ to a numeral in the base ten numeration system, cylinders 52–58 are rotated to display 1011 through windows 70 and cylinders 28 and 38 are manipulated to bring the base two exponential numerals and the place values thereof into view through windows 68 and 72, respectively. Again, multiplying the place value numerals appearing in each window 72 by those digits appearing in windows 70 and adding the products, as indicated by symbols 74 and 78 on the face of front wall 14, produces the following result: $(1 \times 8) + (0 \times 4) + (1 \times 2) + 1 \times 1) = 8 + 0 + 2 + 1 = 11_{10}$.

When converting from the base 10 numeration system to a lower base numeration system, the mode of operation of education device 10 is as follows:

Assuming that it is desired to convert $48_{10}$ to a numeral in the base three numeration system, cylinders 28 and 38 are rotated and set to display the row B of exponential notions of the base three numeration system and the row B' of equivalent place values through the rows of windows 68 and 72, respectively. An inspection of the place value row indicates that 27 is the highest place value that can be divided into 48, and dividing the latter by the former yields a quotient of 1 with 21 remaining. Cylinder 58 is rotated to bring the digit 1 into view through window 70 above the place value 27. Proceeding down the exponential or place value scale, it is seen that there are two (9's) in 21 with three remaining. Accordingly, cylinder 56 is rotated to display 2 through the window 70 above the place value 9. Since there is only one 3 in the remaining three, cylinder 54 is rotated to bring the digit 1 into view through window 70 above the place value 3. Dividing the remainder, which is 0, by 1 yields 0 and the latter digit is brought into position above the place value 1 by rotating cylinder 52. The combination of digits appearing in windows 70 yields the numeral 1210. Thus $48_{10} = 1210_3$.

When equating a numeral from one base numeration system to one other than 10, an intermediate step is required to first equate the known numeral to a base 10 numeral and then equating the latter to the desired base numeration system. As an illustration assume that it is desired to convert $15_6$ to the base two numeration system. Following the procedures outlined above, it is found that $15_6 = 11_{10}$ and $11_{10} = 1011_2$.

From the foregoing, it is apparent that the present invention fully accomplishes its intended objects and provides an improved educational training device for stimulating interest in the comprehension of various base numeration systems and for aiding the user in converting a numeral in one base numeration system to corresponding numerals in other base numeration systems. The educational training device is relatively small and compact for ease in storage and transport and can be conveniently supported on a student's desk or table. Various amusement games each having different game objectives and predetermined rules to follow can be played with the educational training device of this invention, thereby further generating interest in the understanding and learning of various base numeration systems and the conversion of numerals from one to the other of such various base numeration systems.

A preferred embodiment of this invention having been disclosed in detail, it is to be understood that this has been done by way of illustration only.

We claim:

1. An educational device for use as an aid in converting a numeral from one base numeration system to a numeral in another base numeration system comprising: A frame having a front wall provided with a plurality of horizontally extending rows of windows; an elongated cylinder mounted on said frame behind said front wall; a plurality of circumferentially spaced, longitudinally extending rows of indicia provided on the periphery of said cylinder; each row of indicia representing equivalent place values of exponential notations of a desired base numeration system; means for rotating said cylinder to expose a selected row of said place values through one of said rows of windows; means mounted on said frame in vertically spaced relation to said cylinder for displaying numerals through a second row of windows in said front wall, and mathematical symbols imprinted on the outer face of said frame front wall for indicating the mathematical procedure to be followed to facilitate computation of said place values and said numerals in the process of converting a numeral from one base numeration system to an equivalent numeral in another base numeration system.

2. An educational device according to claim 1 wherein said numeral displaying means comprises a fixed shaft rigidly secured on said frame behind said front wall in substantial parallelism with said cylinder; a plurality of relatively short, rotatable cylinders mounted on said shaft in general registry with the windows in said second row of windows; circumferentially spaced, numerical digits provided on each of said short cylinders; each of said short cylinders being rotatable to expose a selected digit through an associated window in said second row of windows.

3. An educational device according to claim 2 including a second elongated cylinder mounted on said frame behind said front wall in substantial parallelism with said first mentioned cylinder; a plurality of circumferentially spaced, longitudinally extending rows of indicia provided on the periphery of said second cylinder; each row of indicia on said second cylinder representing a series of exponential notations of a predetermined base numeration system; and means for rotating said second cylinder to expose a selected row of said exponential notations through a third row of windows in said front wall.

4. An educational device according to claim 3 wherein said means for rotating said elongated cylinders comprise manually operable knobs adjacent at least one end of each of said elongated cylinders.

5. An educational device according to claim 1 wherein said frame includes a rear wall, a top wall, a pair of side walls and an open bottom end; said front wall being removably secured to said frame to provide access into the interior of said frame.

6. An educational device according to claim 2 including means for maintaining said short cylinders in properly spaced position longitudinally of said fixed shaft and in registry with their associated windows in said second row of windows.

7. An educational device according to claim 6 wherein said maintaining means comprises a pair of elastic rings encircling said fixed shaft on opposite sides of each of said short cylinders.

8. An educational device according to claim 1 wherein said numeral displaying means comprises a fixed shaft rigidly secured on said frame behind said front wall in substantial parallelism with said cylinder and spaced thereabove; a plurality of relatively short, individually rotatable cylinders mounted on said fixed shaft in general registry with the windows in said second row of windows; circumferentially spaced, numerical digits provided on each of said short cylinders; said short cylinders being rotatable to expose selected digits through said second row of windows to form a numeral; a second elongated cylinder mounted on said frame behind said front wall in substantial parallelism with said first mentioned cylinder and spaced above said fixed shaft; a plurality of circumferentially spaced, longitudinally extending rows of indicia provided on the periphery of said second cylinder; each row of indicia on said second cylinder representing a series of exponential notations of a desired base numeration system; means for rotating said second cylinder to expose a selected row of said exponential notations through a third row of windows in said front wall; the windows in each of said horizontally extending rows of windows being in vertical alignment with windows in the other rows of windows; and means for maintaining said short cylinders in properly longitudinally spaced relation on said fixed shaft and in registry with their associated windows in said second row of windows.

9. An educational device according to claim 8 wherein said indicia and said digits are imprinted on strips of material adhesively secured to the peripheral surfaces of said cylinders, respectively.

* * * * *